J. I. KNIGHT.
Corn-Planter.
No. 26,819. Patented Jan. 10, 1860.
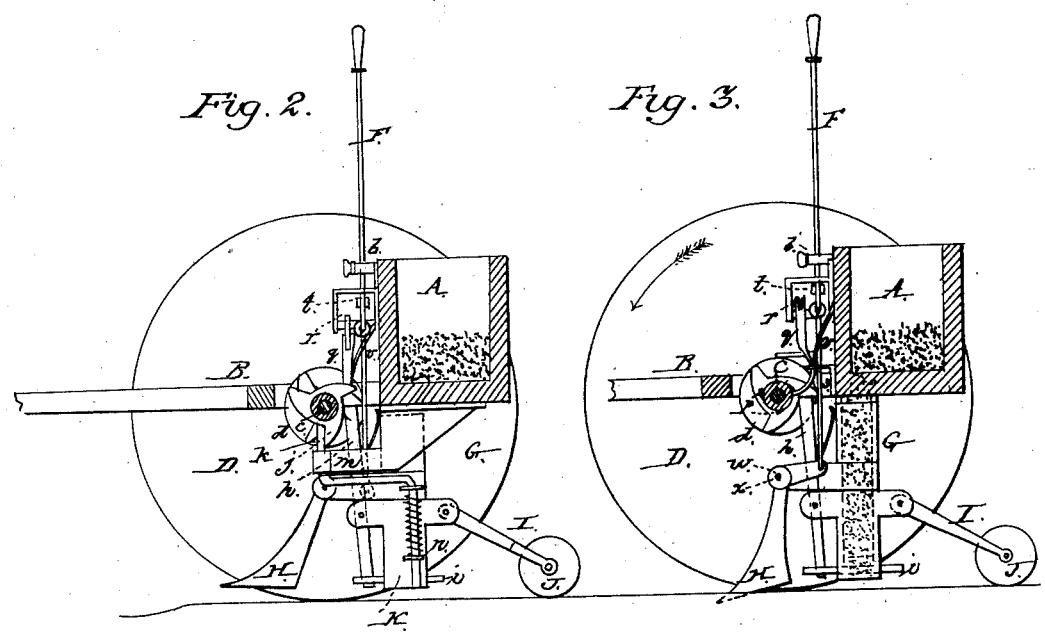
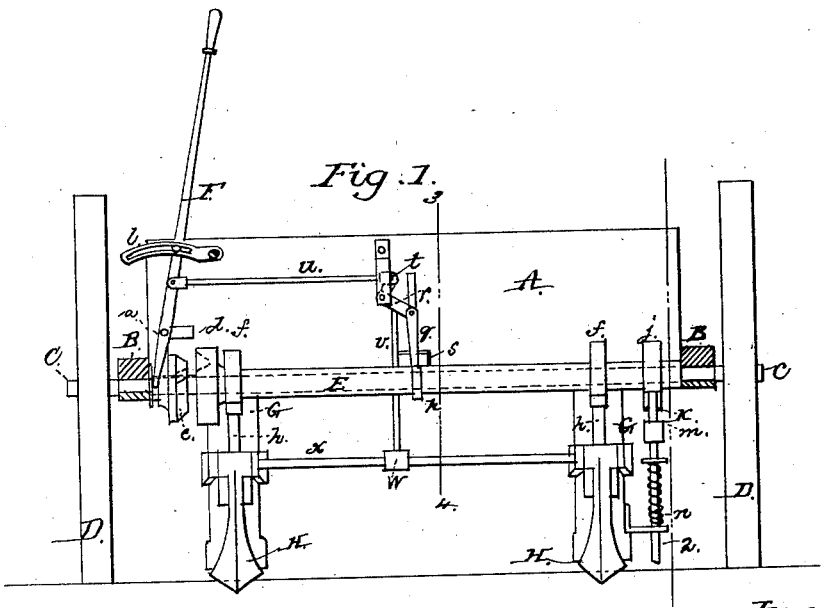
Witnesses:
Inventor:

UNITED STATES PATENT OFFICE.

JOSEPH I. KNIGHT, OF PHILADELPHIA, ASSIGNOR TO HIMSELF, THOMAS PATTERSON, AND JAS. LYNDELL, OF BRISTOL, PENNSYLVANIA.

IMPROVEMENT IN CORN-PLANTERS.

Specification forming part of Letters Patent No. 26,819, dated January 10, 1860.

*To all whom it may concern:*

Be it known that I, JOSEPH I. KNIGHT, of the city and county of Philadelphia, and State of Pennsylvania, have invented certain new and useful Improvements in Corn-Planters; and I do hereby declare the following to be a full, clear, and exact description of the same, reference being had to the accompanying drawings, and to the letters of reference marked thereon.

My invention relates to improvements in that class of corn-planters in which two tubes connected with a hopper are used, the said tubes having each a slide operated from an axle, with driving-wheels hung to shafts on which the said hopper is situated, and by means of which the machine is drawn over the ground.

My improvements consist of an axle with a sleeve provided with ratchet-wheels for operating the planting-levers, and having a clutch-box operated by a lever connected to a catch for operating a third ratchet-wheel on the sleeve, and also connected to a lever on a shaft, to which the plow-teeth for opening the furrows are hung, the whole of the parts being combined and arranged for joint action in the manner described hereinafter, so that the sleeve may be partialy turned to its proper position on the axle, the plow-teeth depressed or raised, and the clutch thrown in or out of gear by the operating of one lever.

In order to enable others skilled in this class of machines to make and use my invention, I will now proceed to describe its construction and operation.

On reference to the accompanying drawings, which form part of this specification, Figure 1 is a front view of my improved corn-planter; Fig. 2, a sectional elevation on the line 1 2, Fig. 1; Fig. 3, the same on the line 3 4, Fig. 1.

Similar letters refer to similar parts throughout the several views.

A is the box or hopper for receiving the corn to be planted, this box being secured to the shafts B, by means of which the machine is drawn over the ground, and on the under side of which turns the axle C, the latter being furnished at each end with a suitable driving-wheel, D.

E is a loose sleeve, fitting snugly to the axle and capable of turning on but having no longitudinal movement independent of the said axle.

On one end of this sleeve is a conical clutch-box, $d$, adapted to receive the clutch $e$, which slides longitudinally on but turns with the axle C, and which is controlled by a lever, F, hung to a pin, $a$, attached to the front of the box or hopper A, a slotted quadrant, $b$, being also secured to the hopper. A screw passing through the slot of this quadrant and into the lever serves to retain the latter in any position to which it has been adjusted.

Near each end and to the under side of the box or hopper A is secured a tube, G, which extends downward to within a short distance from the ground, and which is furnished at the bottom with a slide, $i$, having an orifice, which, when in a certain position, receives a grain of corn from an orifice in the tube, and when in another position discharges the same grain through another orifice into the furrow. The slide $i$ of each tube is connected to the short arm of the lever $h$, which is hung to a lug projecting from the tube, the long arm of this lever projecting upward to within the range of a ratchet-wheel, F, one of which is secured near each end of the sleeve E.

A spring secured to the hopper at the back of each lever $h$ serves to press the latter forward after it has been forced back by and released from one of the teeth of the ratchet-wheel. Another ratchet-wheel, $j$, is secured to the sleeve E, the curved portions of the teeth of this wheel sliding over and depressing the rod $k$ as the sleeve revolves. This rod, as will be seen on reference to Fig. 2, is guided by a bracket, $m$, secured to the under side of the hopper, and by a lug, $n$, on one of the tubes G, a spiral spring surrounding the rod and serving to elevate it after it has been depressed by the teeth of the ratchet-wheel. A fourth ratchet-wheel, $p$, is secured to the middle of the sleeve, the teeth of this wheel being adapted to receive a projection on a rod, $q$, suspended from an arm, $r$, guided by a bracket, $s$, projecting from the front of the hopper and pressed against by a spring of the latter. The arm $r$ is secured to a spindle, which turns at one end in the hopper and at the opposite end in a bracket projecting from the same. Another arm, $t$, on this spindle, is connected by a rod, $u$, to the lever F, and a short arm on the same spindle is connected by a rod, $v$, to an arm, $w$, secured to a shaft, $x$, which turns in lugs projecting one from each of the tubes G, a plow-tooth, H, being secured to the shaft immediately in front of each tube, to lugs in the rear of which is hung an arm, I, carrying a roller, J.

As the machine is drawn over the ground, the driving-wheels D and the axle will revolve in the direction of the arrow, and, providing the clutch $e$ be in gear with the clutch-box $d$, the sleeve E, with its ratchet-wheels, will revolve in the same direction. The ratchet-wheels F F, acting on the levers $h$, will through the latter impart the desired movement to the slides, thereby dropping kernels of corn into the furrows made by the plow-teeth H at intervals the distance apart of which will depend upon the number of teeth on the ratchet-wheels. As the machine advances the furrows made by the teeth H will be closed by the rollers J.

When it is desirable to draw the machine over the ground without planting any corn, the lever F is moved into the position illustrated in Fig. 1, by which movement the clutch $e$ will be thrown out of gear with the box $d$, and at the same time the plow-teeth will be raised from the ground through the rods above described. When the operation of planting has to be again commenced, the lever F is moved outward, so as to bring the clutch $e$ in gear with the box $d$. By this movement of the lever and by the intervention of the rod $u$ and arms $t$ and $r$ the projection on the end of the rod $q$ will catch one of the teeth on the ratchet-wheel $p$ and draw the sleeve E partially round until the teeth of the ratchet-wheels F F are in a proper position to act on the levers $p$. By this arrangement the planting of the corn commences simultaneously with the moving outward of the lever and with the throwing in gear of the clutch.

It will be observed that the lower end of the rod $k$ is exactly opposite to the planting-orifice in the tube G, so that as the sleeve E revolves and as long as the planting is continued the rod $k$ will make an indentation of the ground exactly opposite to the point where each kernel of corn has been planted, and these indentations will serve as a guide to the driver on the machine, who, observing the marks made by the rod near the planted row, can operate the lever F so that the kernels of the next row can be deposited in a line with those already planted.

I wish it to be understood that I do not claim the device herein described, viewed separately; but

I claim as my invention and desire to secure by Letters Patent—

The axle C, with the sleeve E, its ratchet-wheels $f f$, operating the levers $h$, the clutch-box $d$ $e$, operated by the lever F, the latter being connected to a catch, $y$, for operating the ratchet-wheel $p$, and also connected to the lever W on the shaft $x$ for operating the plow-teeth H, when the whole of the parts are combined for joint action as and for the purpose herein set forth.

In testimony whereof I have signed my name to this specification in the presence of two subscribing witnesses.

JOS. I. KNIGHT.

Witnesses:
HENRY HOWSON,
CHARLES D. FREEMAN.